United States Patent
Akuzawa et al.

(10) Patent No.: US 10,158,254 B2
(45) Date of Patent: Dec. 18, 2018

(54) RESONANT COUPLING POWER TRANSMISSION SYSTEM, RESONANCE TYPE POWER TRANSMISSION DEVICE, AND RESONANCE TYPE POWER RECEPTION DEVICE

(71) Applicant: MITSUBISHI ELECTRIC ENGINEERING COMPANY, LIMITED, Tokyo (JP)

(72) Inventors: Yoshiyuki Akuzawa, Tokyo (JP); Kiyohide Sakai, Tokyo (JP); Toshihiro Ezoe, Tokyo (JP)

(73) Assignee: Mitsubishi Electric Engineering Company, Limited, Tokyo (JP)

( * ) Notice: Subject to any disclaimer, the term of this patent is extended or adjusted under 35 U.S.C. 154(b) by 39 days.

(21) Appl. No.: 15/320,215

(22) PCT Filed: Sep. 2, 2014

(86) PCT No.: PCT/JP2014/073067
§ 371 (c)(1),
(2) Date: Dec. 19, 2016

(87) PCT Pub. No.: WO2016/035141
PCT Pub. Date: Mar. 10, 2016

(65) Prior Publication Data
US 2017/0155283 A1 Jun. 1, 2017

(51) Int. Cl.
*H02J 50/12* (2016.01)
(52) U.S. Cl.
CPC .................................. *H02J 50/12* (2016.02)
(58) Field of Classification Search
CPC ....................................................... H02J 50/12
See application file for complete search history.

(56) References Cited

U.S. PATENT DOCUMENTS

2007/0222542 A1 9/2007 Joannopoulos et al.
2009/0051224 A1 2/2009 Cook et al.
(Continued)

FOREIGN PATENT DOCUMENTS

EP 2 306 616 A2 4/2011
EP 2 418 755 A2 2/2012
(Continued)

OTHER PUBLICATIONS

Extended Search Report dated Mar. 29, 2018 in European Patent Application No. 14901211.4.

*Primary Examiner* — Daniel Cavallari
(74) *Attorney, Agent, or Firm* — Oblon, McClelland, Maier & Neustadt, L.L.P.

(57) ABSTRACT

A resonant coupling power transmission system includes a resonance type power transmission device 1 having a resonance type power supply 11 to supply power, and a resonance type transmission antenna 13 to transmit the power supplied by the resonance type power supply 11, and a resonance type power reception device 2 having a resonance type reception antenna 21 to receive the power transmitted by the resonance type transmission antenna 13, and a reception circuit 23 to supply the power received by the resonance type reception antenna 21 to a load, and the characteristic impedance of each of the functional units is set in such a way that there is provided a correlation among the resonance characteristic value of the resonance type power supply 11, that of the resonance type transmission antenna 13, and that of the resonance type power reception device 2.

8 Claims, 8 Drawing Sheets

(56) References Cited

U.S. PATENT DOCUMENTS

| | | | |
|---|---|---|---|
| 2009/0058189 A1 | 3/2009 | Cook et al. | |
| 2012/0001497 A1* | 1/2012 | Sada | H02J 5/005 307/104 |
| 2012/0306269 A1* | 12/2012 | Kim | H02J 7/025 307/11 |
| 2013/0187598 A1 | 7/2013 | Park et al. | |

FOREIGN PATENT DOCUMENTS

| | | |
|---|---|---|
| JP | 2009-501510 A | 1/2009 |
| JP | 2011-177018 A | 9/2011 |
| JP | 2012-502602 A | 1/2012 |
| WO | WO 2007/008646 A2 | 1/2007 |
| WO | WO 2008/118178 A1 | 10/2008 |

* cited by examiner

FIG.8

RESONANT COUPLING POWER TRANSMISSION SYSTEM, RESONANCE TYPE POWER TRANSMISSION DEVICE, AND RESONANCE TYPE POWER RECEPTION DEVICE

FIELD OF THE INVENTION

The present invention relates to a resonant coupling power transmission system that performs power transmission by using the resonance characteristics of resonance type transmission and reception antennas, a resonance type power transmission device, and a resonance type power reception device.

BACKGROUND OF THE INVENTION

Conventionally, a device that transmits energy by radio is known (for example, refer to patent references 1 to 3). This device is configured with a first resonator structure (resonance type transmission antenna) and a second resonator structure (resonance type reception antenna) located at a long distance from this first resonator structure. The first resonator structure receives energy from a power supply source (alternating current output power supply), and transfers the energy to the second resonator structure by using an electromagnetism resonance (magnetic field resonant coupling) without radiation. Further, the second resonator structure receives the energy from the first resonator structure and supplies this energy to an external load (reception circuit). Further, the resonance characteristic value Q1 of the first resonator structure and the resonance characteristic value Q2 of the second resonator structure are set in such a way as to satisfy the following equation (1).

$$\sqrt{(Q1 \cdot Q2)} > 100 \qquad (1)$$

As a result, the distance between the first and second resonator structures can be enlarged to be greater than its characteristic size (distance according to conventional electromagnetic induction) without reduction in the transmission efficiency of the energy.

RELATED ART DOCUMENT

Patent Reference

Patent reference 1: Japanese Unexamined Patent Application Publication No. 2011-177018
Patent reference 2: Japanese Unexamined Patent Application Publication (Translation of PCT Application) No. 2012-502602
Patent reference 3: Japanese Unexamined Patent Application Publication (Translation of PCT Application) No. 2009-501510

SUMMARY OF THE INVENTION

Problems to be Solved by the Invention

A problem with the conventional devices disclosed in patent references 1 to 3 is, however, that while only the resonance characteristic values Q1 and Q2 of the first and second resonator structures are taken into consideration, a variation in the resonance characteristic value which is caused by the power supply source connected to the first resonator structure and a variation in the resonance characteristic value which is caused by the external load connected to the second resonator structure are not taken into consideration.

More specifically, an interface that performs matching between impedances needs to be disposed for each circuit block in a high frequency circuit. On the other hand, because only the resonance characteristic values Q1 and Q2 of the first and second resonator structures are taken into consideration in the conventional devices, the above-mentioned interface is disposed between the first resonator structure and the power supply source and between the second resonator structure and the external load. In this configuration, power transmission can be performed between the first and second resonator structures with a high degree of efficiency. However, from the viewpoint of the whole system including the power supply source and the external load, the power loss becomes very large because the system includes the interfaces as mentioned above.

Another problem is that when the degree of coupling between the first and second resonator structures is not appropriate under the requirement given by the equation (1), that is, depending upon the distance between the first and second resonator structures, the loss energy is large and efficient power transmission cannot be performed. A further problem is that the antenna configurations of the first and second resonator structures are limited and there is no flexibility under the above-mentioned requirement, and it is difficult to achieve downsizing, weight reduction, and cost reduction. A still further problem is that because a high voltage is applied to a capacitor, which is used as a part of each of the first and second resonator structures, under the above-mentioned requirement, special parts, such as high-voltage capacitors, are needed, and it is difficult to achieve downsizing, weight reduction, and cost reduction.

The present invention is made in order to solve the above-mentioned problems, and it is therefore an object of the present invention to provide a resonant coupling power transmission system that can perform settings which take into consideration variations in resonance characteristic values which are caused by influences of a resonance type power supply and a reception circuit, and provide an improvement of the efficiency of the power transmission in the whole system as compared with the conventional devices, a resonance type power transmission device, and a resonance type power reception device.

Means for Solving the Problem

In accordance with the present invention, there is provided a resonant coupling power transmission system including: a resonance type power transmission device having a resonance type power supply to supply power, and a resonance type transmission antenna to transmit the power supplied by the resonance type power supply; and a resonance type power reception device having a resonance type reception antenna to receive the power transmitted by the resonance type transmission antenna, and a reception circuit to supply the power received by the resonance type reception antenna to a load, in which the characteristic impedance of each of the functional units is set in such a way that there is provided a correlation among the resonance characteristic value of the resonance type power supply, that of the resonance type transmission antenna, and that of the resonance type power reception device.

Advantages of the Invention

Because the resonant coupling power transmission system in accordance with the present invention is configured as above, the resonant coupling power transmission system can perform settings which take into consideration variations in the resonance characteristic values which are caused by influences of the resonance type power supply and the reception circuit, and provide an improvement of the efficiency of the power transmission in the whole system as compared with the conventional devices.

EMBODIMENTS OF THE INVENTION

Hereafter, the preferred embodiments of the present invention will be explained in detail with reference to the drawings.

Embodiment 1

Figure 1:
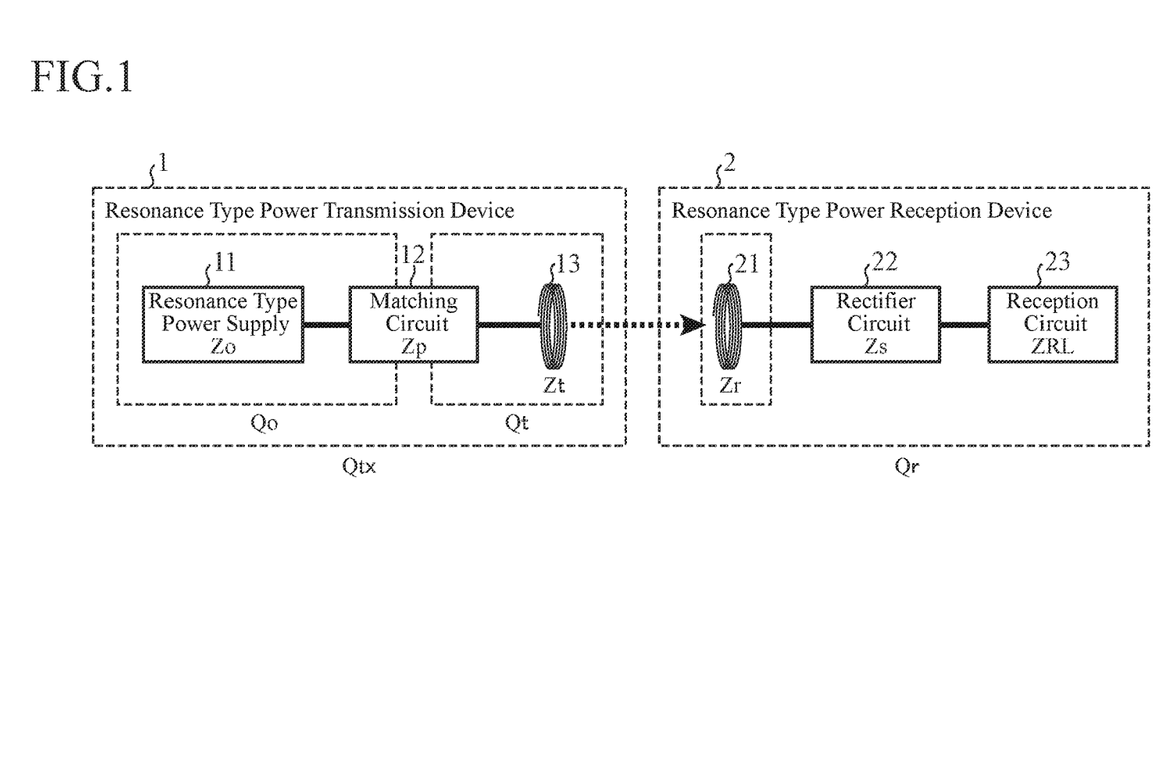
FIG. 1 is a diagram showing the configuration of a resonant coupling power transmission system in accordance with Embodiment 1 of the present invention.
Figure 2:
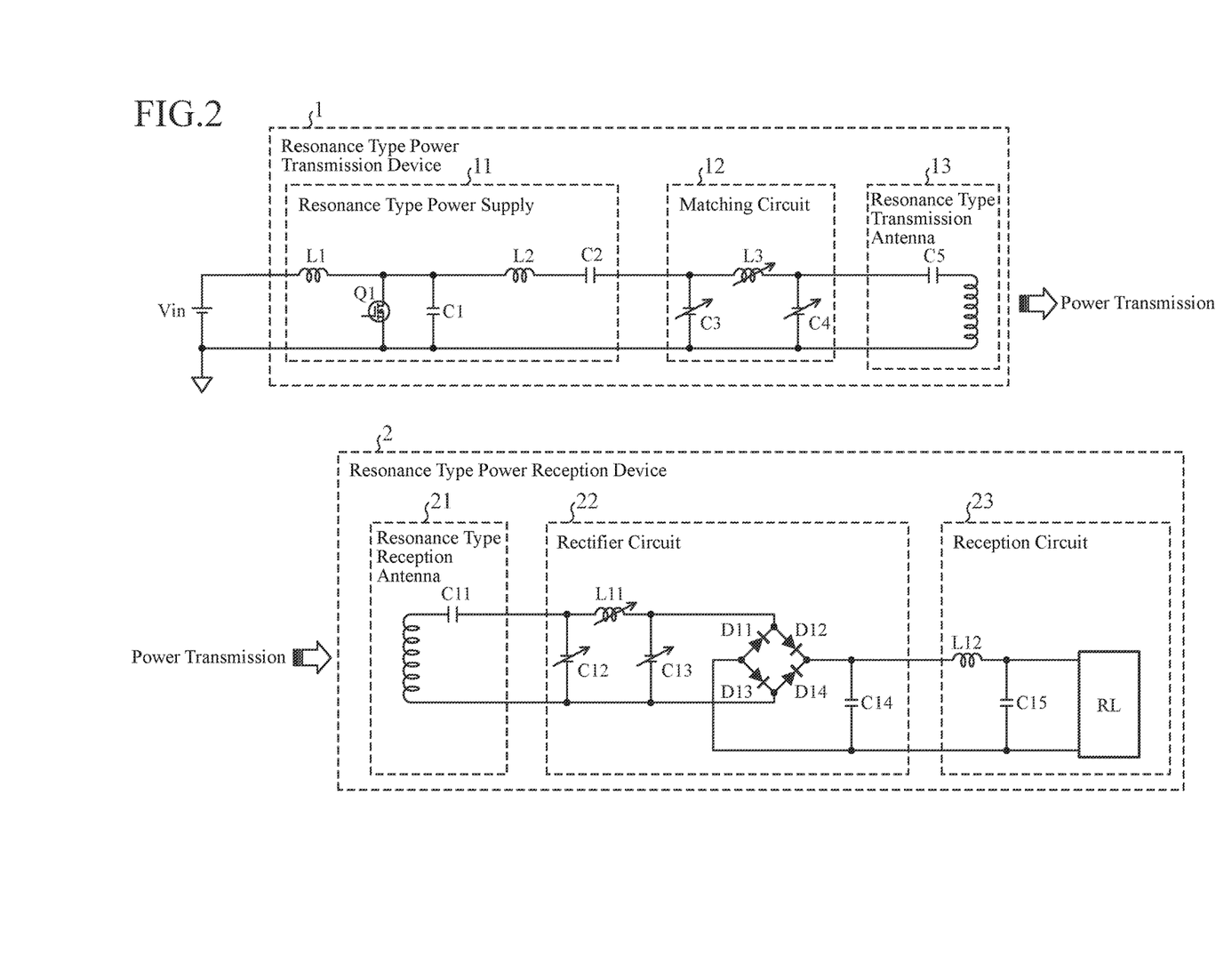
FIG. 2 is a circuit diagram showing the configuration of the resonant coupling power transmission system in accordance with Embodiment 1 of the present invention.

FIG. 1 is a diagram showing the configuration of a resonant coupling power transmission system in accordance with Embodiment 1 of the present invention, and FIG. 2 is a concrete circuit diagram.

The resonant coupling power transmission system is configured with a resonance type power transmission device 1 and a resonance type power reception device 2, as shown in FIGS. 1 and 2. Although a case in which a resonance type power supply 11, which will be described below, whose resonance frequency is equal to or greater than 2 MHz is disposed in the resonant coupling power transmission system shown in FIG. 2 is shown, a resonance type power supply whose resonance frequency is less than 2 MHz can be alternatively used.

The resonance type power transmission device 1 is configured with the resonance type power supply 11, a matching circuit 12, and a resonance type transmission antenna 13.

The resonance type power supply 11 controls the supply of power to the resonance type transmission antenna 13, and converts direct current or alternating current input power into an alternating current having a predetermined frequency, and outputs this alternating current. This resonance type power supply 11 is configured with a power supply circuit based on a resonance switching method, and has an output impedance Zo, a resonance frequency fo, and a resonance characteristic value Qo.

The matching circuit 12 performs impedance matching between the output impedance Zo of the resonance type power supply 11, and the pass characteristic impedance Zt of the resonance type transmission antenna 13. This matching circuit 12 is configured with a filter of pi type or L type which consists of inductors L and capacitors C, and has the pass characteristic impedance Zp of the filter.

The resonance type transmission antenna 13 receives the alternating current power from the resonance type power supply 11 via the matching circuit 12, and performs a resonance operation to generate a non-radiative electromagnetic field in the vicinity thereof, thereby performing transmission of the power to the resonance type reception antenna 21. This resonance type transmission antenna 13 is a resonance type antenna having a coil shape, and has the pass characteristic impedance Zt of the antenna, a resonance frequency ft, and a resonance characteristic value Qt.

Further, the resonance frequency fo and the resonance characteristic value Qo of the resonance type power supply 11 are determined from the output impedance Zo of the resonance type power supply 11 and the pass characteristic impedance Zp of the matching circuit 12. The resonance frequency ft and the resonance characteristic value Qt of the resonance type transmission antenna 13 are determined from the pass characteristic impedance Zt of the resonance type transmission antenna 13 and the pass characteristic impedance Zp of the matching circuit 12.

It is then seen that the resonance type power transmission device 1 has a resonance characteristic value $Qtx=\sqrt{(Qo \cdot Qt)}$ on the basis of these two resonance characteristic values Qo and Qt.

The resonance type power reception device 2 is configured with a resonance type reception antenna 21, a rectifier circuit 22, and a reception circuit 23. This resonance type power reception device 2 has a resonance frequency fr and a resonance characteristic value Qr.

The resonance type reception antenna 21 receives the power by performing a resonant coupling operation of coupling with the non-radiative electromagnetic field from the resonance type transmission antenna 13, and outputs the alternating current power. This resonance type reception antenna 21 is a resonance type antenna having a coil shape, and has the pass characteristic impedance Zr of the antenna.

The rectifier circuit 22 is a matching rectifier circuit having a rectifying function of converting the alternating current power from the resonance type reception antenna 21 into direct current power, and a matching function of performing impedance matching between the pass characteristic impedance Zr of the resonance type reception antenna 21 and the input impedance ZRL of the reception circuit 23. The matching function is configured with a filter of pi type or L type which consists of inductors L and capacitors C. The rectifier circuit 22 also has a pass characteristic impedance Zs. Although the rectifier circuit 22 having the rectifying function and the matching function is shown above, the rectifier circuit is not limited to this example, and can consist of only the rectifying function even though its rectifying efficiency drops.

The reception circuit 23 receives the direct current power from the rectifier circuit 22, and converts this direct current power into a predetermined voltage and supplies this predetermined voltage to a load (not shown). This reception circuit 23 is configured with an LC filter (smoothing filter) for smoothing a high-frequency voltage ripple, a DC/DC converter for converting the direct current power into the predetermined voltage, and so on, and has the input impedance ZRL of the LC filter. As an alternative, the DC/DC converter can be eliminated, and the reception circuit can be configured with only the smoothing filter.

Further, the resonance characteristic value Qr and the resonance frequency fr of the resonance type power reception device 2 are determined from the pass characteristic impedance Zr of the resonance type reception antenna 21, the pass characteristic impedance Zs of the rectifier circuit 22, and the input impedance ZRL of the reception circuit 23.

The power transmission method according to the resonant coupling between the resonance type transmission and reception antennas 13 and 21 is not limited, and can be any of a method according to a magnetic field resonance, a method according to an electric field resonance, a method according to electromagnetic induction, and a resonant coupling method of contact type.

Then, in accordance with the present invention, the characteristic impedance of each of the functional units is set in such a way that there is provided a correlation among the resonance characteristic value Qo of the resonance type power supply 11, the resonance characteristic value Qt of the resonance type transmission antenna 13, and the resonance characteristic value Qr of the resonance type power reception device 2. More specifically, the resonance characteristic value Qtx ($=\sqrt{(Qo \cdot Qt)}$) of the resonance type power transmission device 1 is made to get close to the resonance characteristic value Qr of the resonance type power reception device 2 (the following equation (2)). Concretely, what is necessary is just to cause the resonance characteristic value of the resonance type power transmission device to fall within the range given by the following equation (3).

$$\sqrt{(Qo \cdot Qt)} \approx Qr \quad (2)$$

$$0.5 Qr \leq \sqrt{(Qo \cdot Qt)} \leq 1.5 Qr \quad (3)$$

As a result, in consideration of a variation in the resonance characteristic value which is caused by an influence of the resonance type power supply 11 connected to the resonance type transmission antenna 13, and a variation in the resonance characteristic value which is caused by an influence of the reception circuit 23 connected to the resonance type reception antenna 21, settings can be made to the resonance type power transmission device 1 and the resonance type power reception device 2. As a result, efficient power transmission can be implemented as the whole system.

Figure 3:
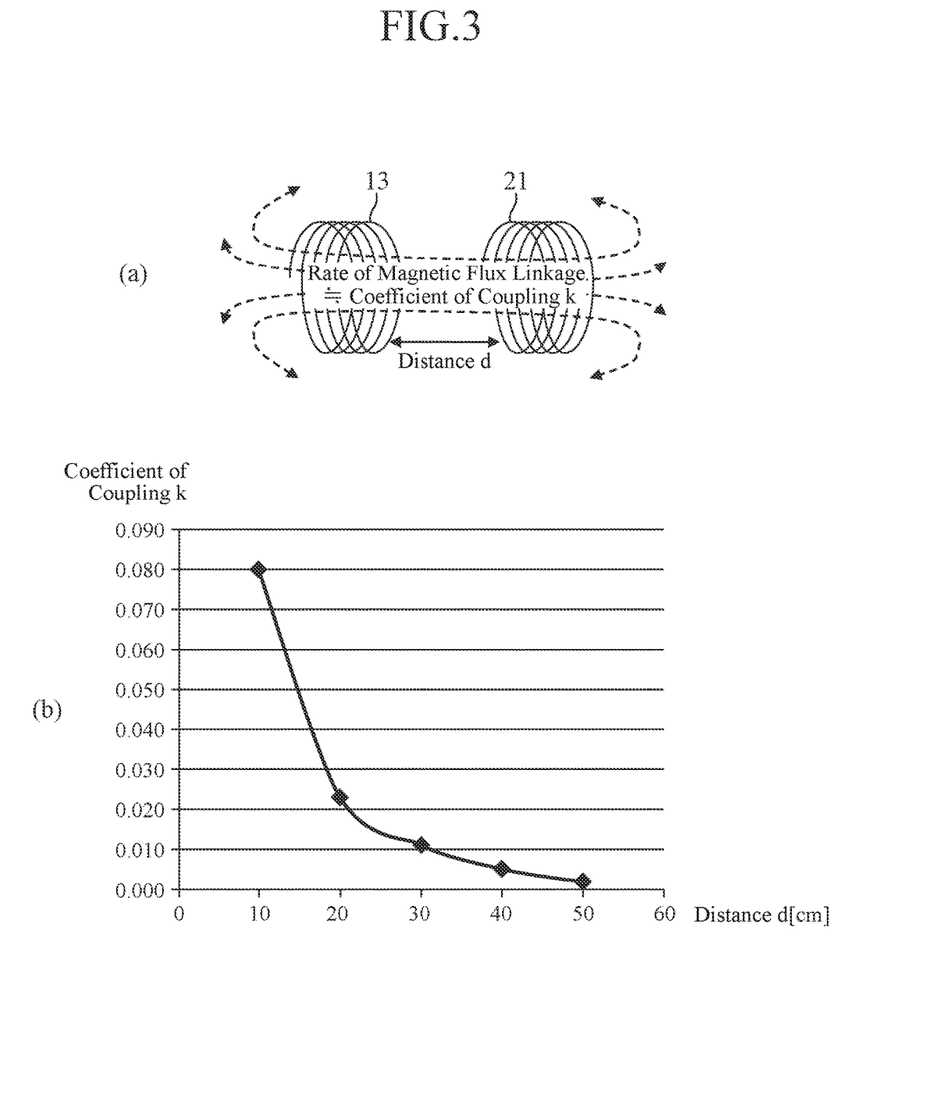
FIG. 3 is a diagram showing a relation between a distance and a coefficient of coupling between resonance type transmission and reception antennas in the resonant coupling power transmission system in accordance with Embodiment 1 of the present invention.

Next, a relation between the distance d and the coefficient of coupling k ($\approx$ a rate of magnetic flux linkage) between the resonance type transmission and reception antennas 13 and 21 will be explained by using FIG. 3. In this case, when the diameter phi of each of the resonance type transmission and reception antennas 13 and 21 (helical-type antennas) is set to 18 [cm], the relation between the distance d and the coefficient of coupling k is as shown in FIG. 3(b). More specifically, the shorter the distance d, the larger the coefficient of coupling k, while the longer the distance d, the smaller the coefficient of coupling k.

However, by providing a correlation among the three resonance characteristic values Qo, Qt, and Qr, as shown in the present invention, the distance between the resonance type transmission and reception antennas 13 and 21 can be increased to be greater than the distance according to conventional electromagnetic induction without reduction in the power transmission efficiency.

Further, in the resonance type power transmission device 1, the characteristic impedance of each of the functional units is set in such a way as to satisfy the following equation (4). Concretely, what is necessary is just to cause the characteristic impedance to fall within the range given by the following equation (5).

$$k\sqrt{(Qo \cdot Qt)} \approx 1 \quad (4)$$

$$0.5 \leq k\sqrt{(Qo \cdot Qt)} \leq 1.5 \quad (5)$$

Further, in the resonance type power reception device 2, the characteristic impedance of each of the functional units is set in such a way as to satisfy the following equation (6). Concretely, what is necessary is just to cause the characteristic impedance to fall within the range given by the following equation (7).

$$k \cdot Qr \approx 1 \quad (6)$$

$$0.5 \leq k \cdot Qr \leq 1.5 \quad (7)$$

Figure 4:
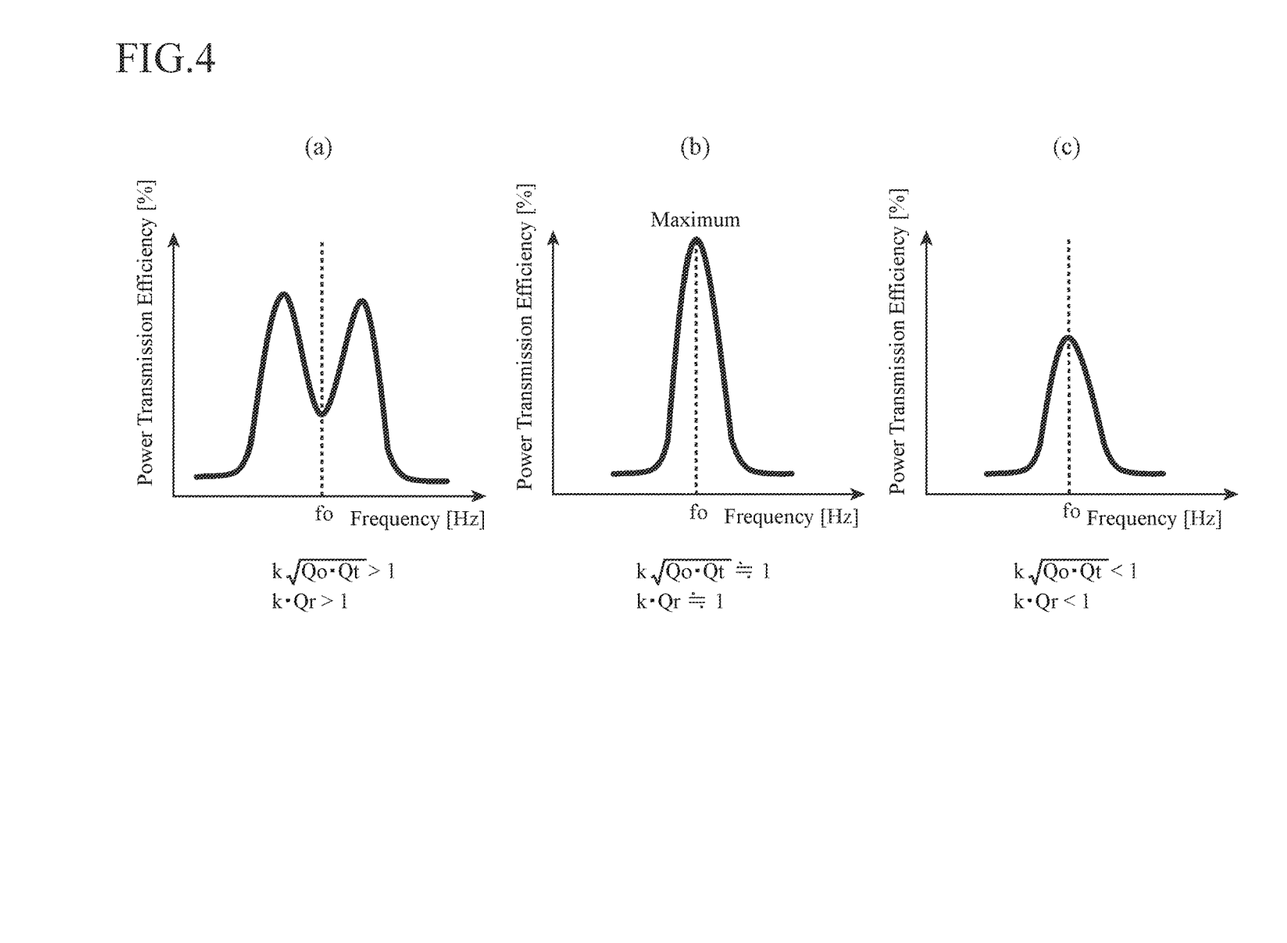
FIG. 4 is a diagram showing the power transmission efficiency of the resonant coupling power transmission system in accordance with Embodiment 1 of the present invention, and FIG. 4($a$) is a diagram showing the case of $k\sqrt{(Qo \cdot Qt)}>1$ and $k \cdot Qr>1$, FIG. 4($b$) is a diagram showing the case of $k\sqrt{(Qo \cdot Qt)} \approx 1$ and $k \cdot Qr \approx 1$, and FIG. 4($c$) is a diagram showing the case of $k\sqrt{(Qo \cdot Qt)}<1$ and $k \cdot Qr<1$.

As a result, as shown in FIG. 4, the power transmission efficiency as the whole system can be improved.

Figure 5:
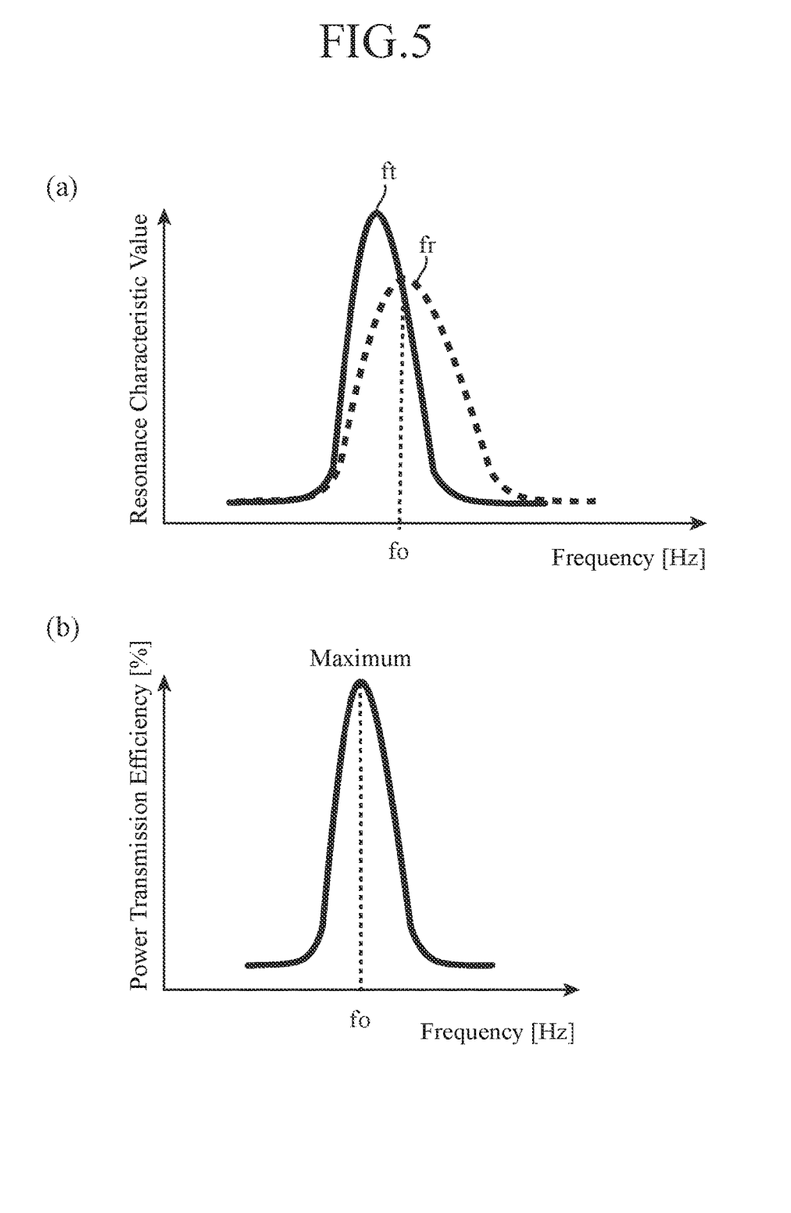
FIG. 5 is a diagram explaining settings of the resonance frequencies of the resonance type transmission and reception antennas in the resonant coupling power transmission system in accordance with Embodiment 1 of the present invention, FIG. 5($a$) is a diagram showing the resonance frequencies of the resonance type transmission and reception antennas, and FIG. 5($b$) is a diagram showing the power transmission efficiency according to the settings of the resonance frequencies of the resonance type transmission and reception antennas.

In addition, as shown in FIG. 5(a), under the requirements shown in the equations (2) and (3), the resonance frequency ft (solid line) of the resonance type transmission antenna 13 and the resonance frequency fr (broken line) of the resonance type reception antenna 21 are set to different values. In this case, ideally, the resonance frequencies ft and fr are shifted from each other in such a way that the point of intersection of the resonance characteristic values Qtx and Qr is the highest, and this point of intersection is made to match the resonance frequency fo of the resonance type power supply 11. As a result, as shown in FIG. 5(b), the resonance characteristic value in the equations (2) and (3) can be made to get close to its maximum, and at the resonance frequency (transmission frequency) fo, the power transmission efficiency can be made to get close to its maximum.

Next, a difference between the conventional devices and the present invention will be explained.

In the conventional devices, the resonance characteristic value Q1 of the first resonator structure (resonance type transmission antenna) and the resonance characteristic value Q2 of the second resonator structure (resonance type reception antenna) are set to high values in such a way as to satisfy the equation (1), as mentioned above. In contrast, in accordance with the present invention, there is provided a correlation among the following three resonance characteristic values: the resonance characteristic value Qo of the resonance type power supply 11, the resonance characteristic value Qt of the resonance type transmission antenna 13, and the resonance characteristic value Qr of the resonance type power reception device 2. As a result, the distance between the resonance type transmission and reception antennas 13 and 21 can be increased to be greater than the distance according to conventional electromagnetic induction without reduction in the power transmission efficiency. More specifically, in accordance with the present invention, even when the resonance characteristic values √(Qo·Qt) and Qr of the resonance type transmission and reception antennas 13 and 21, which correspond to the resonance characteristic values Q1 and Q2 of the conventional devices, are lower than those of the conventional devices, efficient power transmission to a long distance can be performed. Hereafter, concrete examples will be shown.

First, a case of setting the resonance characteristic value Qo of the resonance type power supply 11 to 4, the resonance characteristic value Qt of the resonance type transmission antenna 13 to 6, and the resonance characteristic value Qr of the resonance type power reception device 2 to 5 at the resonance frequency fo of the resonance type power supply 11 will be shown.

In this case, a relation given by the following equation (8) is established.

$$\sqrt{(Qo \cdot Qt)} \approx Qr \approx 5 \quad (8)$$

At that time, it is seen from the equations (4) and (6) that on the condition that the coefficient of coupling k satisfies the following equation (9), most efficient power transmission can be performed.

$$k \approx 1/5 = 0.2 \quad (9)$$

In this case, when the diameter phi of each of the resonance type transmission and reception antennas 13 and 21 is set to 18 [cm] (FIG. 3), in order to make the above-mentioned coefficient of coupling satisfy k=0.2, what is necessary is just to set the distance d between the resonance type transmission and reception antennas 13 and 21 to about 7 cm. Further, the transmission efficiency η excluding a copper loss occurring between the resonance type transmission and reception antennas 13 and 21 is given by the following equation (10).

$$\eta \approx k\sqrt{(\sqrt{(Qo \cdot Qt)} \cdot Qr)} = 99\% \quad (10)$$

Next, a case of setting the resonance characteristic value Qo of the resonance type power supply 11 to 40, the resonance characteristic value Qt of the resonance type transmission antenna 13 to 60, and the resonance characteristic value Qr of the resonance type power reception device 2 to 50 at the resonance frequency fo of the resonance type power supply 11 will be shown.

In this case, a relation given by the following equation (11) is established.

$$\sqrt{(Qo \cdot Qt)} \approx Qr \approx 50 \quad (11)$$

At that time, it is seen from the equations (4) and (6) that on the condition that the coefficient of coupling k satisfies the following equation (12), most efficient power transmission can be performed.

$$k \approx 1/50 = 0.02 \quad (12)$$

In this case, when the diameter phi of each of the resonance type transmission and reception antennas 13 and 21 is set to 18 [cm] (FIG. 3), in order to make the above-mentioned coefficient of coupling satisfy k=0.02, what is necessary is just to set the distance d between the resonance type transmission and reception antennas 13 and 21 to about 20 cm. Further, the transmission efficiency η excluding a copper loss occurring between the resonance type transmission and reception antennas 13 and 21 is given by the equation (10).

Next, a case of setting the resonance characteristic value Qo of the resonance type power supply 11 to 120, the resonance characteristic value Qt of the resonance type transmission antenna 13 to 80, and the resonance characteristic value Qr of the resonance type power reception device 2 to 100 at the resonance frequency fo of the resonance type power supply 11 will be shown.

In this case, a relation given by the following equation (13) is established.

$$\sqrt{(Qo \cdot Qt)} \approx Qr \approx 100 \quad (13)$$

At that time, it is seen from the equations (4) and (6) that on the condition that the coefficient of coupling k satisfies the following equation (14), most efficient power transmission can be performed.

$$k \approx 1/100 = 0.01 \quad (14)$$

In this case, when the diameter phi of each of the resonance type transmission and reception antennas 13 and 21 is set to 18 [cm] (FIG. 3), in order to make the above-mentioned coefficient of coupling satisfy k=0.01, what is necessary is just to set the distance d between the resonance type transmission and reception antennas 13 and 21 to about 30 cm. Further, the transmission efficiency η excluding a copper loss occurring between the resonance type transmission and reception antennas 13 and 21 is given by the equation (10).

As mentioned above, because in accordance with this Embodiment 1, the characteristic impedance of each of the functional units is set in such a way that there is provided a correlation among the resonance characteristic value Qo of the resonance type power supply 11, the resonance characteristic value Qt of the resonance type transmission antenna 13, and the resonance characteristic value Qr of the resonance type power reception device 2, settings can be made to the resonance type power transmission device 1 and the resonance type power reception device 2 in consideration of variations in the resonance characteristic values which are caused by influences of the resonance type power supply 11 and the reception circuit 23, increase in the efficiency of the power transmission as the whole system can be achieved as compared with the conventional devices. Further, the distance between the resonance type transmission and reception antennas 13 and 21 can be increased to be greater than the distance according to conventional electromagnetic induction independently upon the resonance characteristic values of the resonance type transmission and reception antennas 13 and 21 without reduction in the power transmission efficiency.

In addition, because it is not necessary to increase the resonance characteristic values of the resonance type transmission and reception antennas 13 and 21, antenna design of the resonance type transmission and reception antennas 13 and 21 can be implemented with a high degree of flexibility which is not limited according to the resonance characteristic values, and downsizing, weight reduction, and cost reduction can be achieved. Further, because it is not necessary to use special parts, such as high-voltage capacitors, as the capacitors used as a part of the resonance type transmission and reception antennas 13 and 21, downsizing, weight reduction, and cost reduction can be achieved.

Figure 6:
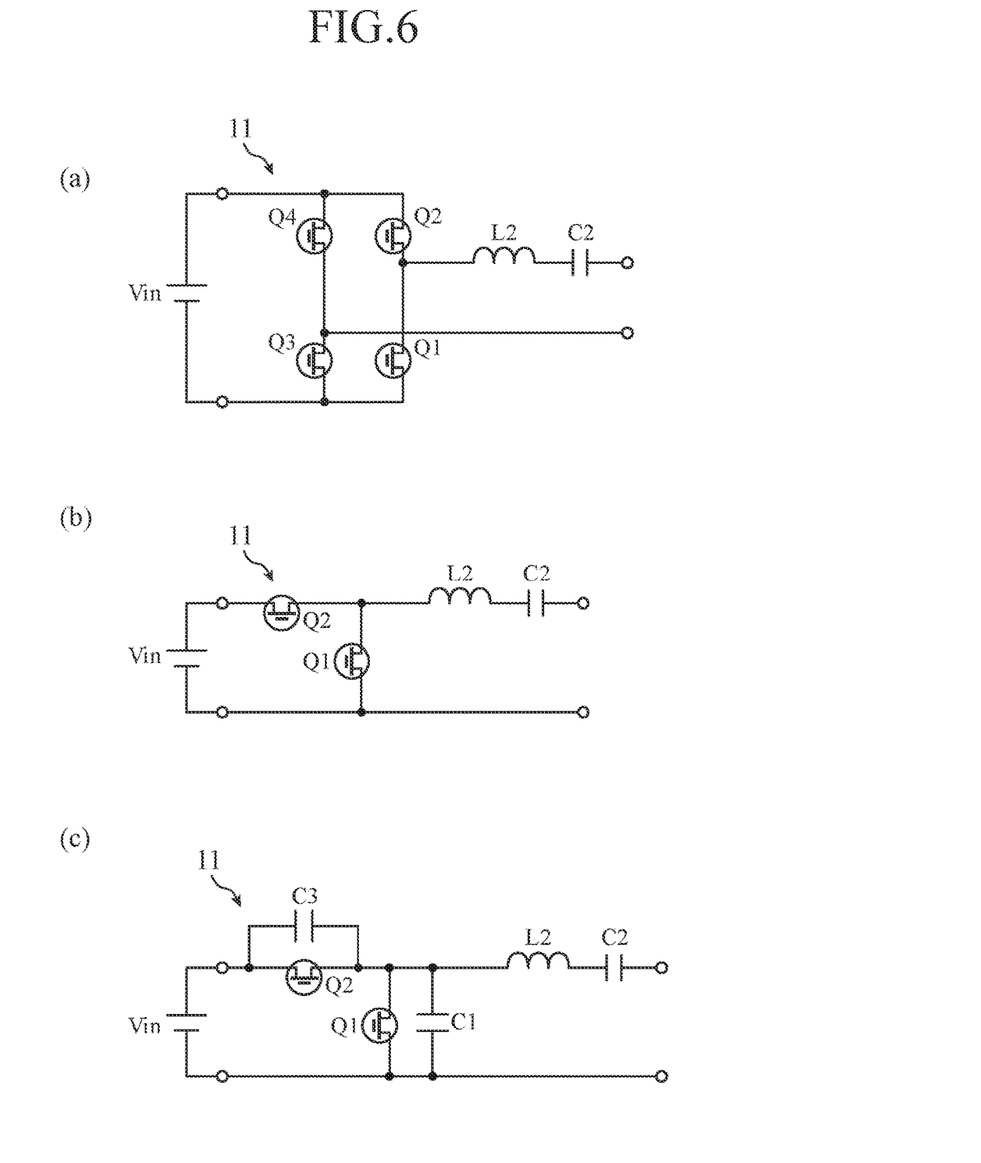
FIG. 6 is a circuit diagram showing the configurations of other examples of a resonance type power supply circuit in accordance with Embodiment 1 of the present invention, and FIG. 6($a$) is a diagram showing a bridge type converter, FIG. 6($b$) is a diagram showing a class-D converter, and FIG. 6($c$) is a diagram showing a class-DE converter.

The resonance type power supply 11 in accordance with the present invention is not limited to the one having the circuit structure shown in FIG. 2. For example, the resonance type power supply can have such a circuit structure as shown in FIG. 6. FIG. 6(a) shows a bridge type converter, FIG. 6(b) shows a class-D converter, and FIG. 6(c) shows a class-DE converter.

Figure 7:
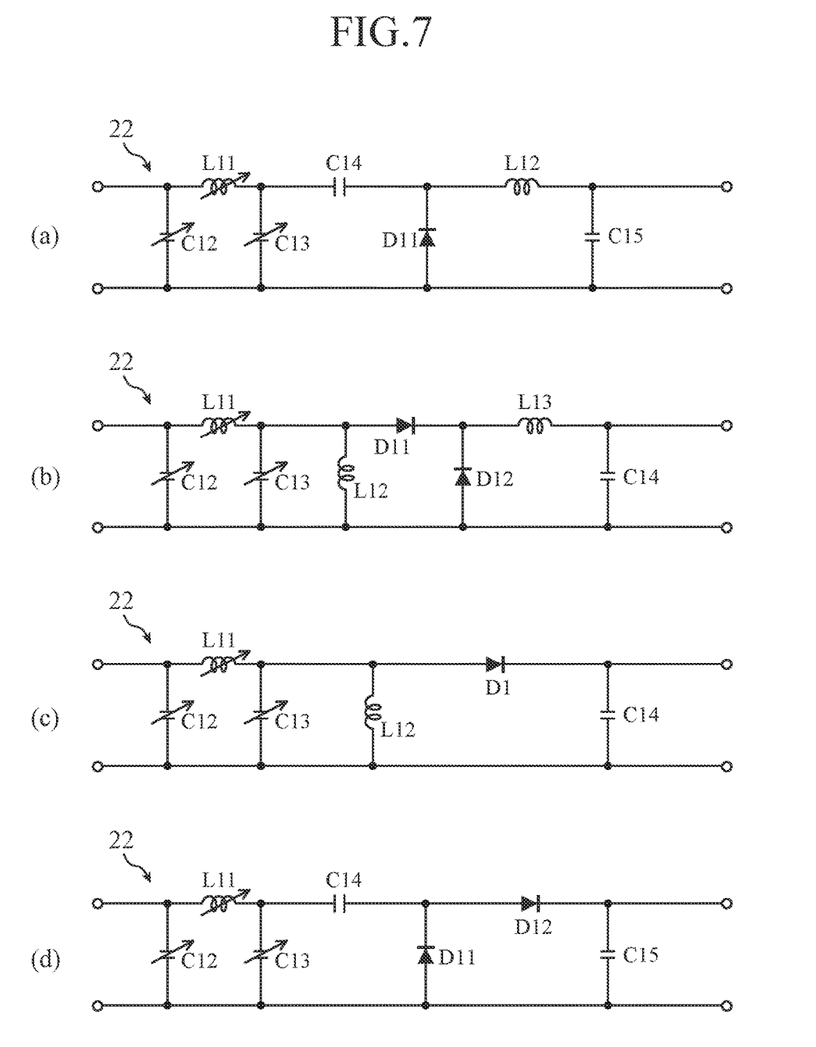
FIG. 7 is a circuit diagram showing the configurations of other examples of a rectifier circuit in accordance with Embodiment 1 of the present invention, and FIG. 7($a$) is a diagram showing a class-E rectifier circuit, FIG. 7($b$) is a diagram showing a current doubler rectifier circuit, FIG. 7($c$) is a diagram showing a half wave rectifier circuit, and Fig. (d) is a diagram showing a voltage doubler rectifier circuit.

Further, the rectifier circuit 22 in accordance with the present invention is not limited to the one having the circuit structure shown in FIG. 2. For example, the rectifier circuit can have such a circuit structure as shown in FIG. 7. FIG. 7(a) shows a class-E rectifier circuit, FIG. 7(b) shows a current doubler rectifier circuit, FIG. 7(c) shows a half wave rectifier circuit, and FIG. 7(d) shows a voltage doubler rectifier circuit.

Figure 8:
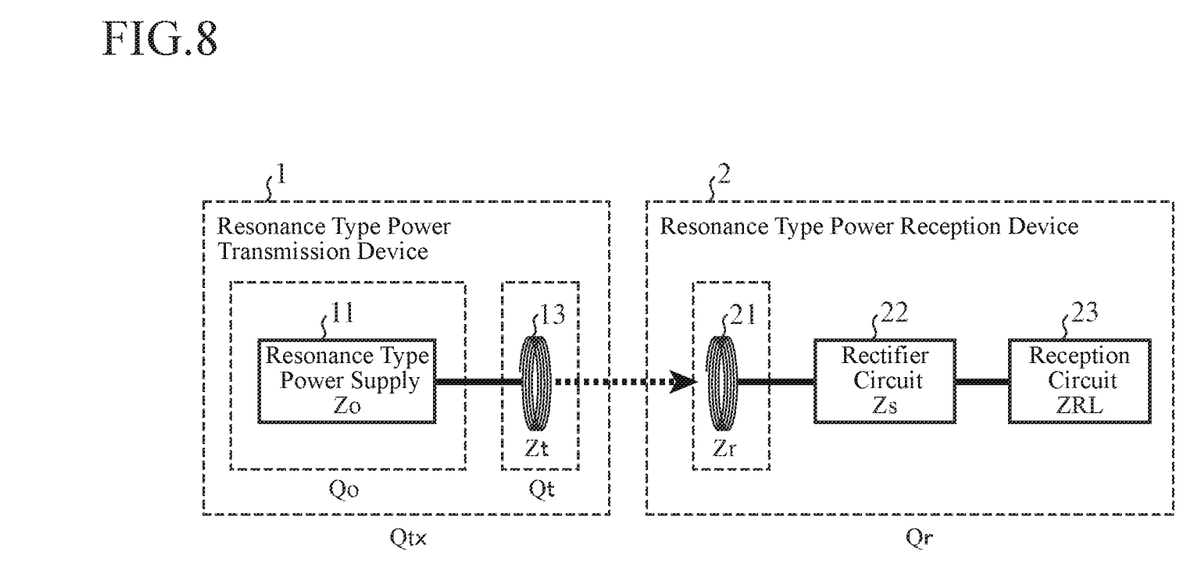
FIG. 8 is a diagram showing the configuration of another example of the resonant coupling power transmission system in accordance with Embodiment 1 of the present invention.

Further, in FIG. 1, the case in which the matching circuit 12 is disposed in the resonance type power transmission device 1 is shown. However, the present invention is not limit to this example, and the resonance type power transmission device can be alternatively configured so as not to include the matching circuit 12, as shown in FIG. 8. In this case, the resonance frequency fo and the resonance characteristic value Qo of the resonance type power supply 11 are determined from the output impedance Zo of the resonance type power supply 11 and the pass characteristic impedance Zt of the resonance type transmission antenna 13. Further, the resonance frequency ft and the resonance characteristic value Qt of the resonance type transmission antenna 13 are determined from the pass characteristic impedance Zt of the resonance type transmission antenna 13 and the output impedance Zo of the resonance type power supply 11.

In addition, while the invention has been described in its preferred embodiment, it is to be understood that various changes can be made in an arbitrary component in accordance with the embodiment, and an arbitrary component in accordance with the embodiment can be omitted within the scope of the invention.

INDUSTRIAL APPLICABILITY

The resonant coupling power transmission system in accordance with the present invention is suitable for use as a resonant coupling power transmission system that can perform settings which take into consideration variations in the resonance characteristic values which are caused by influences of the resonance type power supply and the reception circuit, and provide an improvement of the efficiency of the power transmission in the whole system as compared with the conventional devices, and that performs power transmission by using the resonance characteristics of the resonance type transmission and reception antennas, and so on.

EXPLANATIONS OF REFERENCE NUMERALS

1 resonance type power transmission device, 2 resonance type power reception device, 11 resonance type power supply, 12 matching circuit, 13 resonance type transmission antenna, 21 resonance type reception antenna, 22 rectifier circuit, and 23 reception circuit.

The invention claimed is:
1. A resonant coupling power transmission system comprising:
   a resonance type power transmission device having a resonance type power supply to supply power, and a resonance type transmission antenna to transmit the power supplied by said resonance type power supply; and
   a resonance type power reception device having a resonance type reception antenna to receive the power transmitted by said resonance type transmission antenna, and a reception circuit to supply the power received by said resonance type reception antenna to a load,
   wherein when a resonance characteristic value of said resonance type power supply is denoted by $Q_o$, a resonance characteristic value of said resonance type transmission antenna is denoted by $Q_t$, and a resonance characteristic value of said resonance type power reception device is denoted by $Q_r$, characteristic impedances of said resonance type power supply, said resonance type transmission antenna, said resonance type reception antenna, and said reception circuit are set in such a way that $0.5Qr \leq \sqrt{(Qo \cdot Qt)} \leq 1.5Qr$ is satisfied.

2. The resonant coupling power transmission system according to claim 1, wherein when a coefficient of coupling between said resonance type transmission antenna and said resonance type reception antenna is denoted by k, wherein $0.5 \leq k\sqrt{(Qo \cdot Qt)} \leq 1.5$ is satisfied.

3. The resonant coupling power transmission system according to claim 1, wherein when a coefficient of coupling between said resonance type transmission antenna and said resonance type reception antenna is denoted by k, wherein $0.5 \leq kQr \leq 1.5$ is satisfied.

4. The resonant coupling power transmission system according to claim 1, wherein a resonance frequency of said resonance type transmission antenna differs from that of said resonance type reception antenna.

5. The resonant coupling power transmission system according to claim 1, wherein a resonance frequency of said resonance type power supply is equal to or greater than 2 MHz.

6. The resonant coupling power transmission system according to claim 1, wherein power transmission according to a resonant coupling between said resonance type transmission antenna and said resonance type reception antenna is a one according to either of a magnetic field, an electric field, and electromagnetic induction.

7. A resonance type power transmission device comprising:
   a resonance type power supply to supply power; and
   a resonance type transmission antenna to transmit the power supplied by said resonance type power supply,
   wherein when a resonance characteristic value of said resonance type power supply is denoted by $Q_o$, a resonance characteristic value of said resonance type transmission antenna is denoted by $Q_t$, and a resonance characteristic value of a resonance type power reception device having a resonance type reception antenna to receive the power transmitted by said resonance type transmission antenna, and a reception circuit to supply the power received by said resonance type reception antenna to a load is denoted by $Q_r$, characteristic impedances of said resonance power supply, said resonance type transmission antenna, said resonance type reception antenna, and said reception circuit are set in such a way that $0.5Qr \leq \sqrt{(Qo \cdot Qt)} \leq 1.5Qr$ is satisfied.

8. A resonance type power reception device comprising:
   a resonance type reception antenna to receive power transmitted by a resonance type power transmission device having a resonance type power supply to supply the power, and a resonance type transmission antenna to transmit the power supplied by said resonance type power supply; and a reception circuit to supply the power received by said resonance type reception antenna to a load, wherein when a resonance characteristic value of said resonance type power supply is denoted by $Q_o$, a resonance characteristic value of said resonance type transmission antenna is denoted by $Q_t$, and a resonance characteristic value of said resonance type power reception device is denoted by $Q_r$, characteristic impedances of said resonance type power supply, said resonance type transmission antenna, said resonance type reception antenna, and said reception circuit are set in such a way that $0.5Q_r \leq \sqrt{(Q_o \cdot Q_t)} \leq 1.5Q_r$ is satisfied.

* * * * *